US006301523B1

(12) United States Patent
Lazzerini

(10) Patent No.: US 6,301,523 B1
(45) Date of Patent: Oct. 9, 2001

(54) APPARATUS AND METHOD OF DISPENSING ASPHALT SEALANT DURING NON-BUSINESS HOURS

(75) Inventor: Larry Lazzerini, Rockton, IL (US)

(73) Assignee: LGM, Inc., Rockford, IL (US)

(*) Notice: Subject to any disclaimer, the term of this patent is extended or adjusted under 35 U.S.C. 154(b) by 0 days.

(21) Appl. No.: 09/616,779

(22) Filed: Jul. 14, 2000

(51) Int. Cl.[7] ..................... G06F 17/00

(52) U.S. Cl. ..................... 700/232; 700/237; 700/244; 700/236

(58) Field of Search ..................... 700/232, 236, 700/237, 244

(56) References Cited

U.S. PATENT DOCUMENTS

| | | | | |
|---|---|---|---|---|
| 3,786,421 | | 1/1974 | Wostl et al. | 340/149 A |
| 3,907,162 | * | 9/1975 | Maxfeld | 222/1 |
| 3,931,497 | | 1/1976 | Gentile et al. | 235/61.7 B |
| 4,072,929 | | 2/1978 | Garmong | 340/147 A |
| 4,085,313 | | 4/1978 | Van Ness | 235/419 |
| 4,100,534 | | 7/1978 | Shifflet, Jr. | 340/149 A |
| 4,107,777 | | 8/1978 | Pearson et al. | 364/465 |
| 4,120,452 | | 10/1978 | Kimura et al. | 235/381 |
| 4,174,806 | | 11/1979 | Zahn | 235/381 |
| 4,254,805 | * | 3/1981 | Reeder | 141/59 |
| 4,801,375 | * | 1/1989 | Padilla | 210/100 |
| 4,831,958 | * | 5/1989 | Selby | 118/108 |
| 4,900,906 | | 2/1990 | Pusic | 235/381 |
| 4,967,366 | | 10/1990 | Kaehler | 364/479 |
| 5,557,529 | * | 9/1996 | Warn et al. | 364/479.02 |
| 5,596,501 | | 1/1997 | Comer et al. | 364/464.23 |
| 5,719,781 | * | 2/1998 | Leatherman et al. | 364/479.02 |
| 5,842,188 | | 11/1998 | Ramsey et al. | 705/416 |
| 5,859,416 | | 1/1999 | Gatto | 235/384 |
| 5,865,346 | | 2/1999 | Del Zotto | 222/108 |
| 5,895,457 | | 4/1999 | Kurowski et al. | 705/413 |
| 5,974,227 | * | 10/1999 | Schave | 392/478 |
| 6,039,123 | | 3/2000 | Webb | 169/45 |
| 6,055,521 | | 4/2000 | Ramsey et al. | 705/413 |
| 6,196,279 | * | 3/2001 | Baker | 141/98 |

FOREIGN PATENT DOCUMENTS

| | | | | |
|---|---|---|---|---|
| WO98/22271A1 | * | 5/1998 | (WO) | B28C/7/02 |

OTHER PUBLICATIONS

*The Phoenix 8000* brochure by Western Electronics (Rev. Jul. 1997).

*Phoenix Fuel Control Systems* brochure page by Tuthill Corporation (Printed Oct. 1998).

* cited by examiner

*Primary Examiner*—Christopher P. Ellis
*Assistant Examiner*—Michael E Butler
(74) *Attorney, Agent, or Firm*—Leydig, Voit & Mayer, Ltd.

(57) ABSTRACT

An asphalt sealant dispensing system includes an electronic user interface adapted to allow customers during non-business hours access to asphalt sealant. A recording device indicates how much asphalt has been pumped and then customers can be billed based on their usage. A security enclosure is provided to prevent access and tampering with the pumps, the strainer, and the meter during non-business hours. The security enclosure is removed to allow access to these components during business hours. Existing systems can be readily retrofit using the present invention. Alternatively, new systems can also be built with the present invention.

14 Claims, 3 Drawing Sheets

APPARATUS AND METHOD OF DISPENSING ASPHALT SEALANT DURING NON-BUSINESS HOURS

FIELD OF THE INVENTION

The present invention generally relates to pumping systems and methods for dispensing asphalt sealant, and more particularly relates to pumping systems and methods for dispensing asphalt sealant to the individual purchasers of asphalt sealant from an asphalt sealant supplier.

BACKGROUND OF THE INVENTION

Local asphalt sealant distributors typically have a large volume tank for holding asphalt sealant for resale to individual asphalt maintenance service companies. To distribute the asphalt sealant to the individual asphalt maintenance service companies, the tank is associated with a hydraulically driven asphalt sealant pump (due to the viscous nature of the asphalt sealant), a hydraulic pump and reservoir for driving the asphalt sealant pump, a mechanical meter for indicating the amount of asphalt sealant pumped and a hose for temporary connection to the smaller tank of the maintenance distributor vehicle. Local asphalt sealant distributors also typically sell other supplies to individual asphalt maintenance service companies such as paint for asphalt striping, crack fillers, brooms, blowers and the like.

Because many commercial parking lots, driveways and thoroughfares are typically subject to heavy traffic and use during normal business hours, it is often desirable to conduct maintenance on the asphalt surfaces of such lots and thoroughfares during non-business hours, such as during evenings, nights or weekends. Such maintenance includes coating the asphalt surface with a coat of asphalt sealant. Asphalt sealant is a water based, highly viscous substance that fills the small cracks and acts as a binder material to seal the asphalt surface. Other activities may also be performed during such maintenance such as filling cracks with crack fillers, and striping the parking spaces with paint. Although it is desirable to conduct maintenance on commercial lots and thoroughfares during non-business hours, it is also often desirable to conduct asphalt maintenance on residential and other smaller commercial lots during normal business hours.

In view of the forgoing, it will readily be appreciated by those in the asphalt sealant and asphalt maintenance industry that local asphalt suppliers have long had and continue to have the difficulty of supplying asphalt sealant during both business hours and non-business hours, in order to stay competitive. Although an asphalt maintenance service company can typically purchase a sufficient amount of crack fillers and paint striping materials (and other supplies such as brooms and blowers), it may not be able to purchase a sufficient amount of asphalt sealant (which is carried in the tank of an asphalt distributor vehicle or trailer) for a particular work job. To meet the needs and maintain customer loyalty, local asphalt sealant distributors have had the burden of supplying asphalt sealant during non-business hours, even though such operations are not typically "open" during non-business hours. Such service during non-business hours is necessary to maintain customer loyalty. This is particularly difficult for smaller local asphalt sealant distributor operations. What this often means is that the actual owner of a local asphalt sealant supplier company has the burden of being telephoned on weekends, evenings, nights and holidays, and then the additional burden of meeting the representative of the asphalt maintenance service company so that asphalt sealant can be dispensed. In light of the foregoing there has been a long existing problem in the asphalt sealant and asphalt maintenance industry dealing with how to service customers during non-business hours.

SUMMARY OF THE INVENTION

It is the primary object of the present invention to provide a system and method for asphalt sealant supplier companies to better and more easily service their customers during non-business hours.

It is a further object of the present invention to increase the availability of asphalt sealant to asphalt maintenance service companies for their usage during non-business hours such as during evenings, nights and weekends.

It is another object of the present invention to achieve these objects while retaining use of the existing equipment already owned by asphalt sealant supplier companies.

In accordance with these and other objectives, the present invention is directed towards a novel apparatus for dispensing asphalt sealant during non-business hours. The apparatus includes more conventional components including a tank containing asphalt sealant; an asphalt sealant pump fluidically connected to the tank adapted to pump asphalt sealant from the tank; and a hydraulic actuating pump having an electrical input and a hydraulic output for driving the asphalt sealant pump. An electromechanical meter is also provided to indicate the amount of asphalt sealant pumped from the tank. To provide for access during non-business hours, the apparatus also includes an electronic user access interface having a user input adapted to identify a customer of the business from a plurality of customers. The user access interface controls the electrical input to the hydraulic actuating pump, allowing pumping of asphalt sealant when a customer is identified and preventing pumping of asphalt sealant when a customer is not identified. A recording device is also provided that is responsive to the meter and adapted to record the amount of asphalt sealant pumped and to whom it was sold.

In addition to being used during non-business hours, the system can also be used during normal business hours. It is an advantage of the invention that existing suppliers can keep track of where or to whom every gallon of sealer is sold during normal business hours using the novel system. This invention also cuts down on employee theft if occurring by recording automatically the amount sold to individual purchasers.

It is an aspect of the invention that a security enclosure is provided to prevent access to certain components during non-business hours to prevent tampering, but allowing access to the asphalt sealant transfer hose via an opening in the security enclosure. The security enclosure securely encloses the meter, the hydraulic actuating pump and the asphalt sealant pump when in a closed position and allows access to the meter, the hydraulic actuating pump and the asphalt sealant pump when in an open position.

It is a feature of the present invention that a second meter readout is provided outside of the security enclosure so that the customer can determine how much asphalt sealant has been pumped during usage of the system during non-business hours.

The present invention is also directed at a novel method of dispensing asphalt sealant from a tank during non-business hours of a business without a representative of said business being present. The method comprises electronically identifying a customer from a plurality of customers. Once a customer is electronically identified, the system provides access to an asphalt sealant pump. The customer is then allowed to pump asphalt sealant from the tank. The amount of asphalt pumped by the customer is then recorded.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
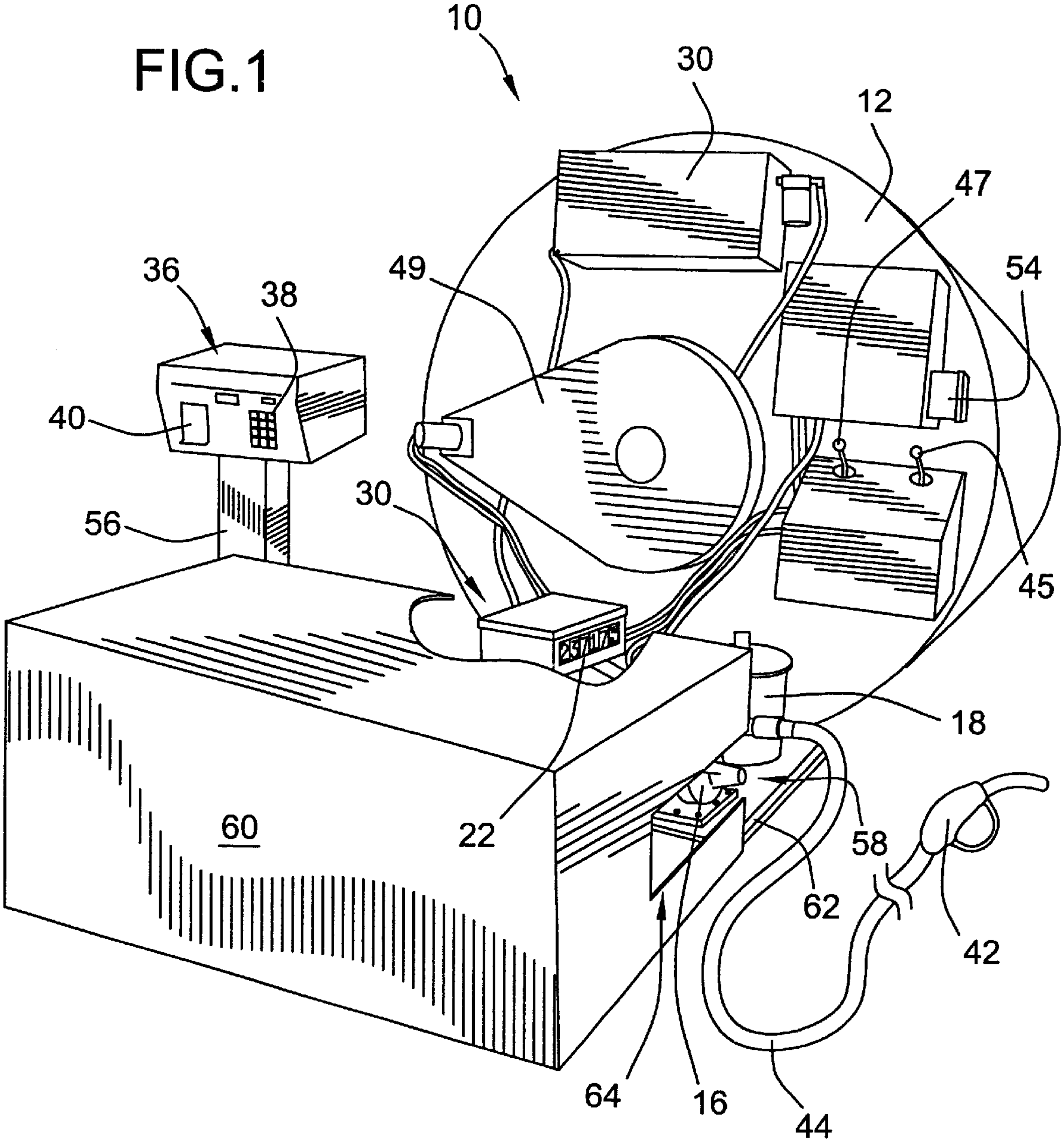
FIG. 1 is a perspective illustration of an asphalt sealant dispensing apparatus according to a preferred embodiment of the present invention, with a top part of the security enclosure being partially fragmented to illustrate further detail.
Figure 2:
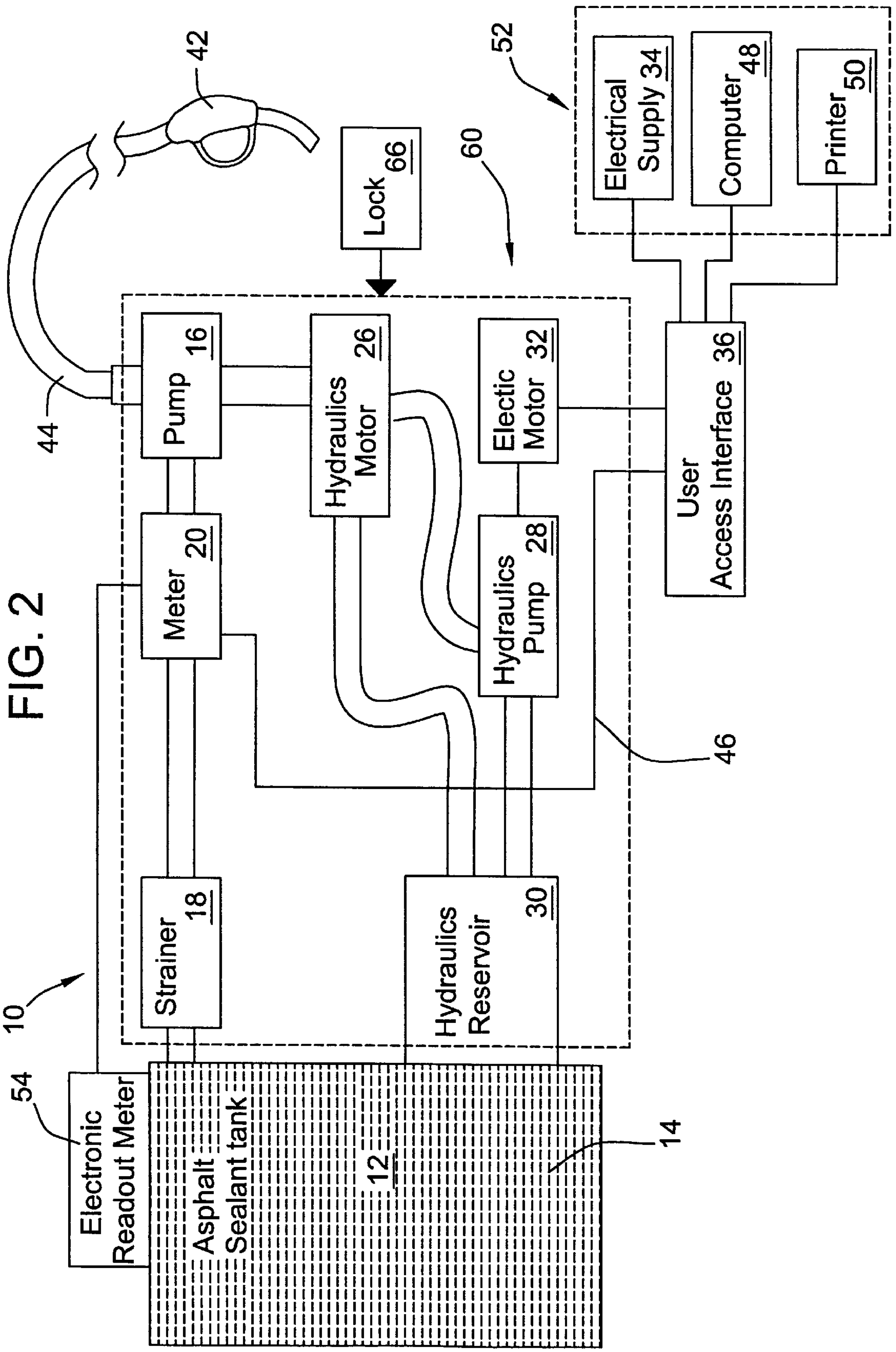
FIG. 2 is a more detailed schematic illustration of the asphalt sealant dispensing apparatus illustrated in FIG. 1.
Figure 3:
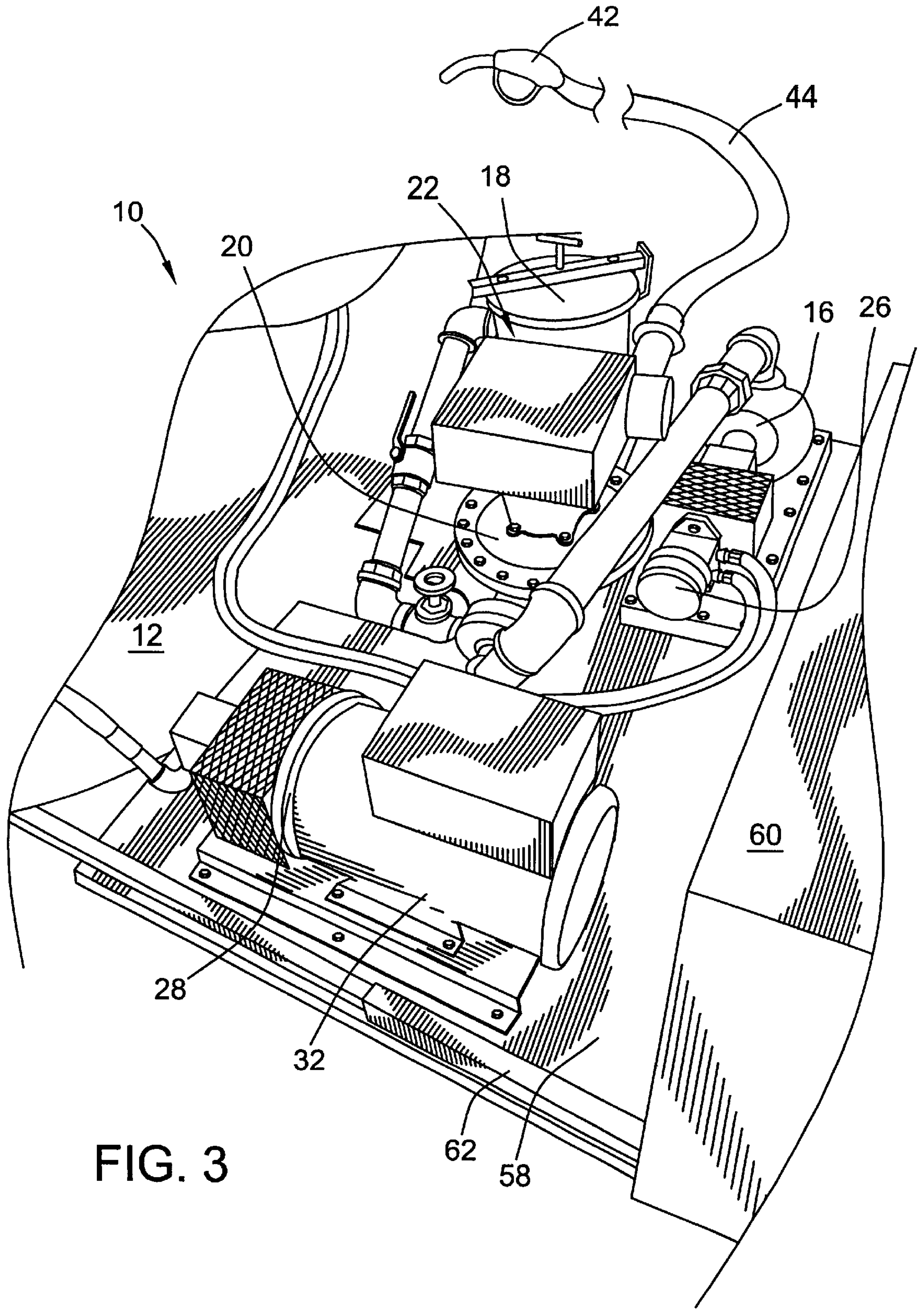
FIG. 3 is a perspective illustration of the pump and associated components of the asphalt sealant dispensing apparatus shown in FIG. 1.

Referring to FIGS. 1—3 a preferred embodiment of the present invention has been depicted as an asphalt sealant dispensing apparatus 10 for dispensing asphalt sealant to customers during business hours (typically 8 a.m. to 5 p.m., Monday through Friday) and during non-business hours (typically the remaining evening, night and weekend hours). The apparatus 10 is used to dispense desired quantities of asphalt sealant into a tank of a asphalt distributor vehicle. Asphalt distributor vehicles are well known in the art and include a spray bar that is adapted to spray the asphalt sealant from the tank over an asphalt surface.

The apparatus 10 generally includes a tank 12 containing a supply of asphalt sealant 14. A bi-directional asphalt sealant pump 16 is fluidically connected to the tank 12 for pumping the asphalt sealant into the mobile asphalt distributor vehicle of the customer and for sucking excess asphalt sealant remaining in the hose at the end of dispensing operations. A strainer 18 is interposed between the pump 16 and the tank 12 to prevent solidified chunks of asphalt sealant or other impurities from being dispensed. A meter 20 is also associated with the pump 16 either upstream or downstream and has a viewable readout 22 for indicating the amount of asphalt sealant pumped. The pump 16 is driven by a hydraulic motor 26 that is actuated by a hydraulic pump 28 using a hydraulic oil reservoir 30. The hydraulic pump 28 is driven by an electrical motor 32 that is powered via an electrical supply 34.

In accordance with the present invention, an electronic access user interface device 36 is provided that includes a user input in the form of a keypad 38 and card key reader 40 for identifying the particular customer pumping asphalt sealant. Preferably the electronic access user interface device 36 is mounted on a stand 56 which is a separate support structure than the support structure 58 for the pumps, meter, and strainer. One electronic access user interface device 36 that has been found suitable is sold under the brand name THE PHOENIX 8000, commercially available from Western Electronics. However, other systems can also be selected for use. This system has been found suitable for converting or retrofitting existing asphalt sealant dispensing systems into the apparatus of the present invention. This particular system requires users to either input a card key or punch in identification numbers (or both) so that a particular customer can be identified separate from other such customers. In either event, the electronic access user interface device 36 acts as a switch between the electrical supply 34 and the electrical motor 32 of the hydraulic pump 28. Once a customer is properly identified, the user access interface device 36 connects the electrical motor 32 of the hydraulic pump 28 to the electrical supply 34 for a predetermined time period measured by a timer in the device 36 corresponding to a time period just greater than the length of time typically necessary for a customer to pump a full tank of asphalt sealant into the largest commercially sized vehicular tank in the asphalt sealant industry. The timer automatically disconnects the electrical supply 34 after the predetermined time period. During the time period when the hydraulic pump 28 is active, a user may actuate the pump 16 via a manually actuated pump control 45. It should be noted that the pump 16 is bi-directional such that asphalt sealant can be sucked back into the tank 10. Once the operator fills the vehicle's tank to the desired amount, the remaining asphalt sealant is sucked back into the tank 10 via manipulation of the pump control 45. The pump control 45 is also external to the security enclosure 60 to allow pumping asphalt through the hose 44 and out nozzle 42 into the tank of the asphalt distributor vehicle when the security enclosure is closed. The other manual control 47 adjacent the pump control 45 is an agitator control 47 for selectively operating a hydraulically driven agitator 49 for the tank 10 to ensure proper mixture of the asphalt sealant 12. The agitator 49 is driven by the hydraulic pump 28 and is not shown in FIG. 2 to keep FIG. 2 easy to understand.

The meter 20 is electromechanical and provides an electronic output indicating the amount of asphalt sealant that has been pumped. A electronic line 46 from the meter 20 indicates the amount of asphalt sealant that has been pumped during the time period of activation. Once the time period is up, the electronic user interface device 36 instructs a recording device such as a computer hard drive 48 and/or printer 50 to record the quantity of asphalt sealant pumped. The recording device including the computer hard drive 48 and printer 50 are stored in a secure location such as an adjacent building 52 to prevent tampering. Likewise, the electrical supply 34 is also secured in the building 52. The electronic user interface device 36 can also have a receipt output to provide a receipt for the customer to indicate the amount of asphalt sealant pumped. The recording devices and access user interface 36 can also be used during business hours to facilitate record keeping.

It is a feature of the present invention that a second electronic meter readout 54 is provided connected to the meter 20 to allow the customer to view how much asphalt has been pumped into the tank of the asphalt distributor vehicle. To provide this second readout 54, it is important that the original meter 20 is electromechanical having an electronic output indicating the quality of asphalt sealant pumped. This readout 54 is preferably located adjacent and on the same side as the pump 16, hose 44 and nozzle such as is shown as mounted on the tank 12 so that the operator can readily view the amount being pumped into the tank of the asphalt distributor vehicle. In contrast, the electronic user interface device 36 is located on the opposite side of the pump 16, hose 44 and nozzle 42, to prevent vehicles from accidentally bumping the device 36.

It is further feature of the present invention that a security enclosure is provided that takes the form of a durable box shaped cover 60. The cover has an open position in which the meter 20, first viewable readout 22, asphalt strainer 18, and pumps 16, 26 are exposed and capable of being accessed. This allows workers to access these components during normal business hours. The cover 60 also has a closed position covering up the meter 20, first viewable readout 22, asphalt strainer 18, and pumps 16, 26 to prevent tampering therewith. As shown in the drawings, the cover 60 is linearly slidably on a track 62 to facilitate movement between open and closed positions. The cover 60 also includes a specially formed slot 64 that allows the hose 44 and pump nozzle 42 to extend past the cover 60 to be accessed during non-business hours, necessary for pumping. Without the slot 64, there would not be any way to access the asphalt sealant during non-business hours. The cover 60 can be locked by a lock 66 in the closed position to prevent removal during non-business hours.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of dispensing asphalt sealant from a tank during non-business hours of a business without a representative of said business being present, comprising:

electronically identifying a customer from a plurality of customers;

accessing an asphalt sealant pump once a customer is electronically identified;

pumping asphalt sealant from the tank; and recording a quantity of asphalt sealant pumped from the tank.

2. The method of claim 1 further comprising:

securely enclosing the pump and associated components including a first readable meter adapted to provide an indication of the amount of asphalt sealant pumped during the non-business hours with a security enclosure to prevent tampering with said pump and associated components, a hose extending outside of the security enclosure during non-business hours; and opening the security enclosure during business hours to allow worker access to said pump and associated components.

3. The method of claim 1 further comprising:

providing a second readable meter output adapted to provide an indication of the amount of asphalt sealant pumped not enclosed by the security enclosure during non-business hours.

4. The method of claim 1 wherein the step of accessing, comprises:

switching an electrical connection to a hydraulic pump to an on state from an off state; and hydraulically actuating the asphalt sealant pump.

5. The method of claim 1, further comprising:

timing the access to the asphalt sealant pump; and ending the access after a predetermined amount of time.

6. An apparatus for dispensing asphalt sealant from a tank during non-business hours of a business without a representative of said business being present, comprising:

means for electronically identifying a customer from a plurality of customers;

means for accessing an asphalt sealant pump once a customer is electronically identified;

means for pumping asphalt sealant from the tank; and means for recording a quantity of asphalt sealant pumped from the tank.

7. An apparatus for dispensing asphalt sealant from a tank during non-business hours of a business without a representative of said business being present, comprising:

a tank containing asphalt sealant;

an asphalt sealant pump fluidically connected to the tank adapted to pump asphalt sealant from the tank;

a hydraulic actuating pump having an electrical input and a hydraulic output, the hydraulic output driving the asphalt sealant pump; and a first meter providing a first meter readout of the amount of asphalt sealant pumped from the tank;

an electronic user access interface having a user input adapted to identify a customer of the business from a plurality of customers, the user access interface controlling the electrical input to the hydraulic actuating pump, allowing pumping of asphalt sealant when a customer is identified and preventing pumping of asphalt sealant when a customer is not identified; and a recorder responsive to the meter adapted to record the amount of asphalt sealant pumped.

8. The apparatus of claim 7 further comprising a security enclosure having open and closed positions, the security enclosure securely enclosing the meter, the hydraulic actuating pump and the asphalt sealant pump during the closed position, a hose adapted to receive pumped asphalt sealant extending outside of the security enclosure when in the closed position, the security enclosure allowing access to the meter, the hydraulic actuating pump and the asphalt sealant pump during the open position.

9. The apparatus of claim 8 wherein the security enclosure is mounted on guide tracks for linear sliding movement between open and closed positions, further comprising a lock locking the security enclosure in the enclosed position.

10. The apparatus of claim 8 further comprising a second meter readout adapted to indicate the quantity of asphalt sealant pumped, the second meter readout mounted external relative to the security enclosure such that the second readable meter readout can be viewed during both open and closed positions.

11. The apparatus of claim 10 wherein the second meter readout is connected to the first meter indicating the output of the first meter.

12. The apparatus of claim 11 wherein the second meter readout is positioned on one side of the security enclosure and the electronic user access interface is positioned on a stand on the other side of the security enclosure.

13. The apparatus of claim 7 wherein the recorder is secured at a non accessible location inside a building.

14. The apparatus of claim 7 wherein the pumps and the meter are supported by a support structure and the electronic user access interface is located on a stand separate from said support structure.

* * * * *